Sept. 7, 1954 — A. ANDERSON — 2,688,403

MAGNETIC SEPARATOR

Filed Jan. 8, 1951 — 4 Sheets-Sheet 1

Inventor
Axel Anderson
Schroeder, Merriam, Hofgren + Brady, Att'ys

Sept. 7, 1954 A. ANDERSON 2,688,403

MAGNETIC SEPARATOR

Filed Jan. 8, 1951 4 Sheets-Sheet 2

Inventor
Axel Anderson
Schroeder, Merriam, Hofgren & Brady
Attys

Sept. 7, 1954 A. ANDERSON 2,688,403

MAGNETIC SEPARATOR

Filed Jan. 8, 1951 4 Sheets-Sheet 3

Inventor
Axel Anderson

Schroeder, Merriam, Hofgren & Brady
Att'ys

Inventor.
Axel Anderson
Schroeder, Merriam, Hofgren & Brady
Att'ys

Patented Sept. 7, 1954

2,688,403

UNITED STATES PATENT OFFICE 2,688,403

MAGNETIC SEPARATOR

Axel Anderson, Rockford, Ill., assignor to Sundstrand Magnetic Products Co., a corporation of Illinois Application January 8, 1951, Serial No. 204,889

4 Claims. (Cl. 210—1.5)

This invention relates to a magnetic separator, and more particularly to a magnetic separator having improved means for removing metal particles from a fluid.

The primary object of the invention is to provide an improved magnetic separator.

Another object is to provide a magnetic separator having magnetic pick-up means comprising a rotatably mounted disk with at least a portion of magnetic material having a plurality of openings extending between opposite faces adjacent the periphery thereof, and a magnet positioned in each of said openings with its opposite pole faces flush with the opposite faces of the disk to provide magnetic pick-up means on each face of the disk, each magnet being spaced from the magnetic portion of the disk.

Another object is to provide a magnetic separator in which the magnets are arranged with all like poles in the same face of the disk.

Another object is to provide a magnetic separator comprising a tank in which a pick-up disk is rotatably mounted, said disk having a width equal substantially to one-third the distance between the side walls of the tank and having a portion of its periphery closely adjacent, but not in contact with the bottom of the tank and its faces substantially equally spaced from the side walls of the tank.

Another object is to provide a magnetic separator having a compartment as aforesaid, together with a scoop in the compartment for removing therefrom particles entering said compartment through said passage, the scoop having a handle extending outside the tank of the separator to provide for easy manipulation of the scoop.

Another object is to provide a magnetic separtor having a spaced pair of scrapers with scraping edges engaging the faces of the disk and operable as the disk rotates to remove particles magnetically held on the opposite faces of the disk, and spring means biasing said scraping edges into engagement with the disk.

Another object is to provide a magnetic separator having a pair of receptacles readily removably mounted for receiving particles removed from the disk by the scrapers, said receptacles each having an overflow spout adapted to project into the tank in which the liquid flows.

A further object of the invention is to provide a removable separating unit including a magnetic disk and power means for rotating the disk, which unit may be removably positioned on a fluid storage vat or tank to remove metallic particles from fluid introduced into the tank, or which may be removed if the fluid is uncontaminated or contaminated with non-magnetic material.

Another object of the invention is to provide a separator of the type described in the preceding paragraphs with a plurality of disks operating to remove magnetic particles from a fluid.

Other objects and advantages of this invention will be apparent from the following detailed description and from the drawings in which.

Figures 1, 2, 3:
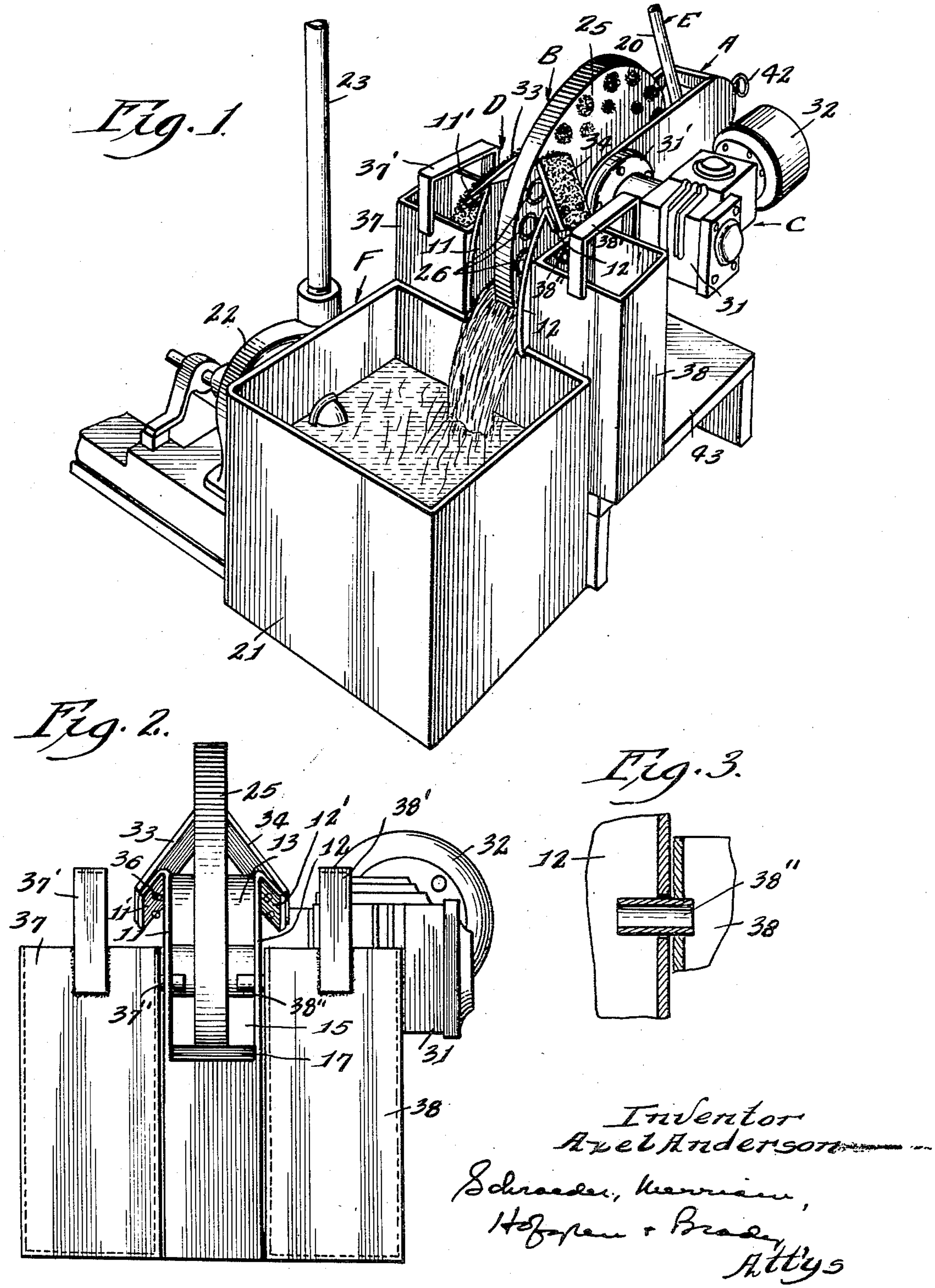
Fig. 1 is a perspective view of a magnetic separator embodying the invention, in association with a coolant liquid pump and coolant container or reservoir of a machine tool.
Fig. 2 is a front elevational view of the separator with the liquid container and pump apparatus removed.
Fig. 3 is a fragmentary vertical section showing in detail the overflow connection of one of the receptacles.

While there is illustrated in the drawings and herein described in detail two forms of the invention, it is to be understood that the invention is not limited to the particular arrangements shown, it being contemplated that various changes may be made by those skilled in the art without departing from the spirit and scope of the invention as expressed in the appended claims.

Referring now to the drawings, the magnetic separator comprises generally a tank A through which used coolant liquid is adapted to flow, a rotary magnetic pick-up device B in the form of a disk for removing metal particles from the fluid in the tank, reduction geared motor means C for driving the pick-up device, scraper means D for removing particles from the pick-up device, and means E and F, respectively for delivering coolant liquid to the tank and for receiving liquid from the tank.

The tank A has a bottom 10 (Fig. 4), a rear end wall 10′, a sloping front end wall 10″, and side walls 11 and 12. An apron 13 is provided in the tank spaced above the bottom 10 and abutting the side walls to form a compartment 14 for liquid below the apron and a trough 15 above the apron for the passage of liquid through the tank. As shown best in Fig. 4, the apron has a longitudinally extending portion 13′ formed in an arc and, in the embodiment of Fig. 4, a hole 16 is provided through the lowest point of the apron which permits liquid to enter the compartment 14. Liquid may flow out of the trough through an overflow spout 17 at the end of the apron.

The liquid delivery means E comprises a pipe 20 for discharging contaminated liquid into one end of the trough 15. The means F comprises a container 21 for receiving liquid cleaned after it has flowed through the trough and is discharged through the spout 17, and a pump 22 to pump the cleaned liquid out of the container 21 through an outlet pipe 23. The liquid may be a liquid coolant for a grinder or other machine tool. After being used in the grinder the coolant flows through the magnetic separator to remove metal particles from the liquid. The inlet pipe 20 may be connected to the outlet of the machine tool cooling means, and the outlet pipe 23 may be connected to the discharge nozzle of the machine tool. The container 21 may comprise the coolant reservoir for the tool.

The magnetic pick-up means B comprises a disk 25 which preferably is of magnetic material, as hot rolled steel. In one embodiment of the invention, the disk has a radius of about 7 inches and a width of three-quarters of an inch. As seen best in Fig. 4, the disk is concentric with the arcuate portion 13′ of the apron and the radius of the disk is only slightly smaller than the radius of said arcuate portion; and as seen in Fig. 5, the width of the disk is substantially one-third the distance between the inner surfaces of the side walls 11 and 12, the distance between the side walls preferably being about 2⅞ inches when a three-quarter inch thick disk is used, and the disk being equally spaced from both side walls.

A plurality of equally spaced openings arranged in two annular rows extend transversely between opposite faces of the disk adjacent the periphery thereof, the rows being concentric with the center of the disk. A permanent bar magnet 26 is positioned in each of the openings with its opposite pole faces flush with the opposite faces of the disk, and said magnets preferably have all like poles in the same face of the disk. In one construction, I have provided the outer row of openings through the disk with a diameter of one inch and the inner row with a diameter of three-quarter inch. I prefer to use permanent magnets of "Alnico 5" having a diameter of about one-quarter inch less than the diameter of the opening in which it is positioned. A non-magnetic bushing 27 is positioned in each opening and spaces the magnet therein from the disk, the ends of the bushing being flush with the faces of the disk.

The construction above described is preferable to other known constructions where the magnets face outwardly from the periphery of a drum, because it provides many times the magnetic area; while the construction readily provides a very efficient magnetic circuit inasmuch as the disk, or at least the portion thereof adjacent the magnets, is of magnetic material, while the non-magnetic bushings provide a high reluctance gap so that the particles which are picked-up by the disk may complete the magnetic circuit. The non-magnetic inserts insure that almost all of the flux will flow through the particles and thereby securely magnetically hold them on the face of the disk.

The disk is mounted on a shaft 30 which projects from a speed reducing mechanism or gear box 31. The gear box housing includes a plate 31′ which is bolted onto the side wall 12 to provide a rigid mounting for the rotatable shaft 30 which is journalled through the side wall. A motor 32 is provided to rotate the disk slowly to pass the magnets 26 through the trough 15 longitudinally thereof and in contact with liquid therein. As the parts appear in Fig. 4, the liquid would flow from left to right through the trough and the disk would rotate in a clockwise direction against the flow of liquid so that particles of magnetic material would be attracted to the magnetic poles on both faces of the disk.

A pair of scrapers 33 and 34 are operable as the disk rotates to remove particles magnetically held on the face of the disk. The scrapers are mounted above the trough on opposite sides of the disk, the side walls 11 and 12 having inclined flanges 11′ and 12′, respectively, for supporting the scrapers. The scrapers may be made from a fibrous material or from any other suitable non-magnetic material, and the scraping edges are kept in contact with the respective faces of the disk by springs 35 (Fig. 7) carried on bolts 36 which are received in threaded openings in the flanges 11′ and 12′. This arrangement insures that the scraping edges always bear against the faces of the disk to remove all particles therefrom, even though the scrapers may wear during use.

Below the respective scrapers 33 and 34 are receptacles 37 and 38 for receiving the magnetic particles removed from the disk by the scrapers. These receptacles have handles respectively shown at 37′ and 38′ and the receptacles are provided with overflow pipes 37″ and 38″, respectively. These pipes are adapted to project through openings in the side walls 11 and 12 to discharge liquid into the trough 15 should the receptacles become filled with liquid during operation before they are filled with magnetic particles.

Figures 4, 8:
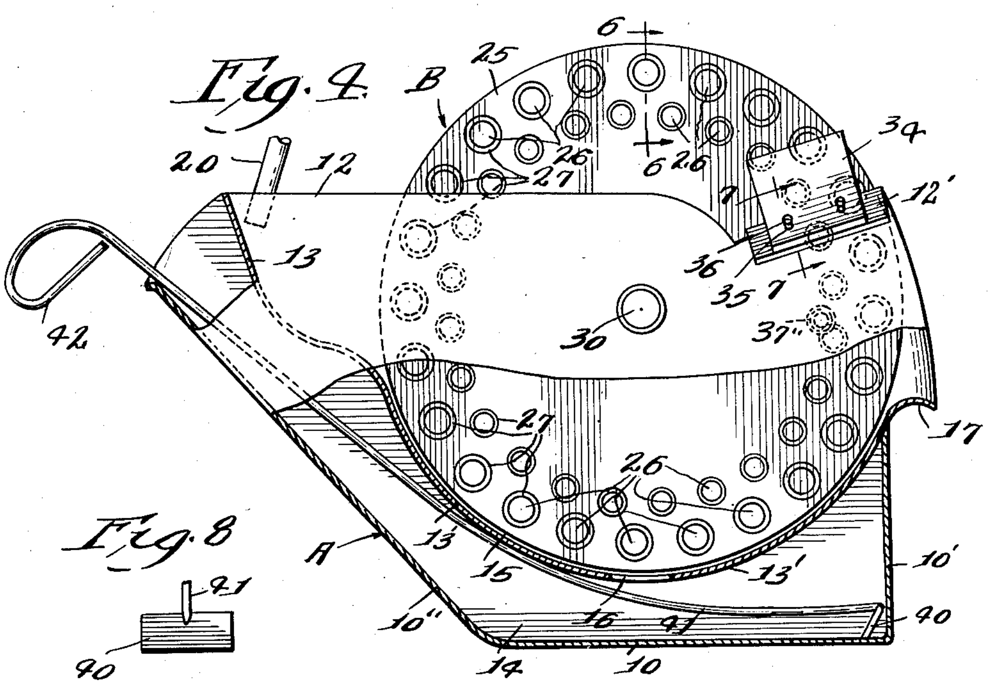
Fig. 4 is a side elevational view of the separator, partly in section.
Fig. 8 is a fragmentary front elevational view of the scoop removed from the tank.
Figures 5, 6, 7:
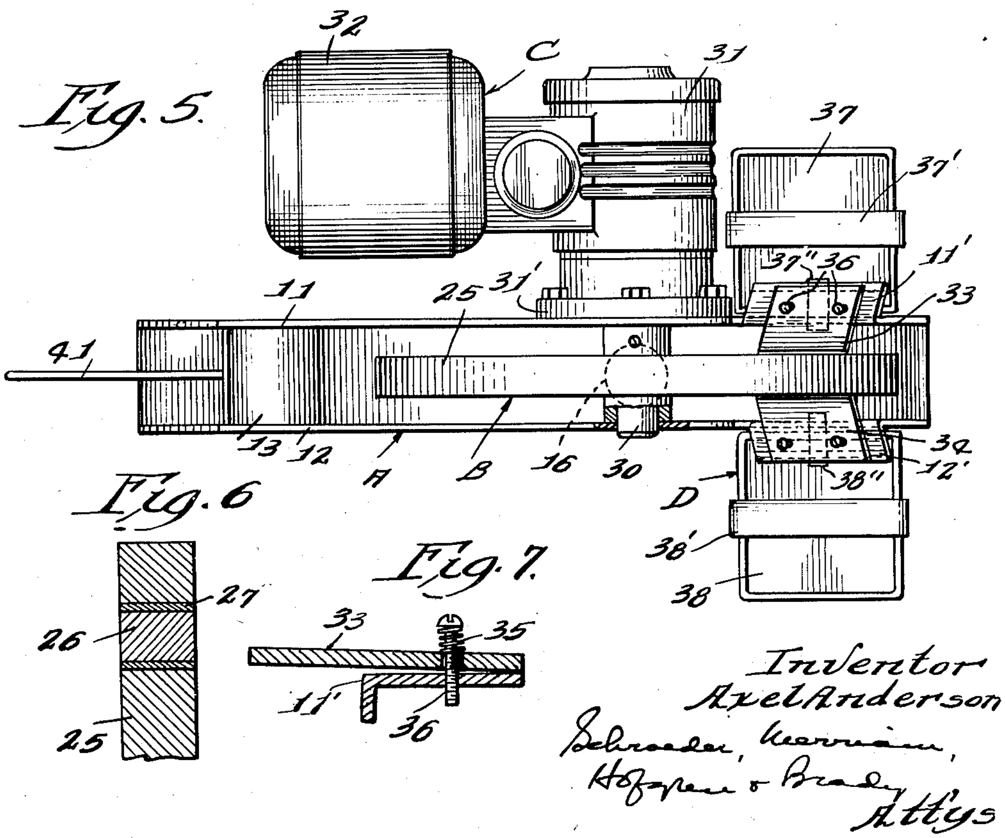
Fig. 5 is a top plan view, partly in section, of the separator shown in Fig. 4.
Fig. 6 is an enlarged fragmentary section along the line 6—6 of Fig. 4.
Fig. 7 is a fragmentary section showing in detail the spring mounting of one of the scrapers, said figure being taken along the line 7—7 of Fig. 4.

In the bottom of the compartment 14 shown in Fig. 4 there is a scoop 40 having a wire handle 41 which extends outside the tank A. Particles which fall through the hole 16 into the compartment 14 may be removed periodically merely by grasping the bent hand grip 42 at the end of the handle 41 and pulling the scoop along the bottom 10 and up the sloping end wall 10.″

In the operation of the apparatus, liquid may be continuously delivered from the machine with which the magnetic separator is associated, and if desired, the parts may be so arranged that the pump 22 and the motor 32 operate whenever the machine tool is in operation so that there is a constant circulation of coolant liquid to the machine and thence through the magnetic separator in order to insure that particles are constantly being removed from the coolant liquid. The disk 25 rotates and removes particles from the liquid in the trough 15. While only particles of magnetic material will be held by magnetic attraction on the face of the disk, the relative slow motion of the disk permits "nests" of these particles to build up as shown in Fig. 1 and these "nests" will act as a filter to catch non-magnetic particles as the liquid flows through the trough. Other particles, both magnetic and non-magnetic, will fall through the hole 16 into the compartment 14. As the disk rotates the particles held on the face thereof are removed by the scrapers 33 and 34 and are deposited in the receptacles 37 and 38. Any liquid which rides up on the disk and falls into the receptacles may return through the over-flow pipes 37'' and 38'', respectively, to the trough if the receptacles fill with liquid. When it is desired to remove the receptacles to empty them, they may readily be removed by grasping the respective handles 37' and 38' and lifting the receptacles off of the bench 43 upon which they rest.

The provision of strong magnetic poles on both opposite faces of the disk doubles the effective magnetic area which would be obtainable in a disk of the same size were the magnets mounted in the periphery facing outwardly therefrom. The arrangement whereby the disk is of magnetic material and non-magnetic inserts are provided to space the bar magnets from the disk provides a complete magnetic circuit without using the sides or bottom of the trough to complete the circuit, and consequently all magnetic particles are attracted to the disk and there is no attraction between the particles and the bottom or sides of the trough, while non-magnetic particles and magnetic particles which are not attracted to the magnets may fall into the compartment 14 and be removed by the scoop 40.

Figure 9:
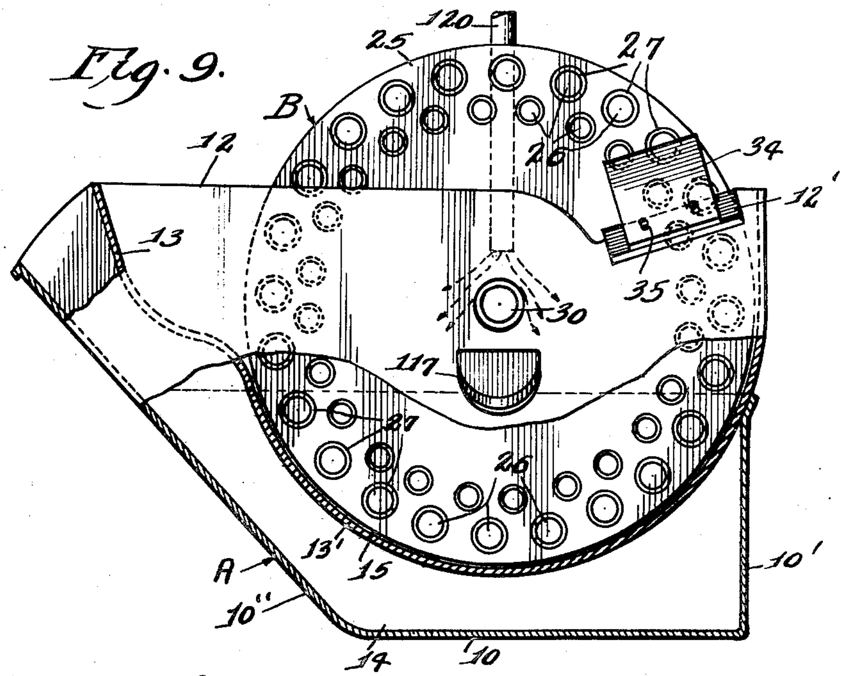
Fig. 9 is a side elevational view, partly in section, of a modified form of separator.
Figure 10:
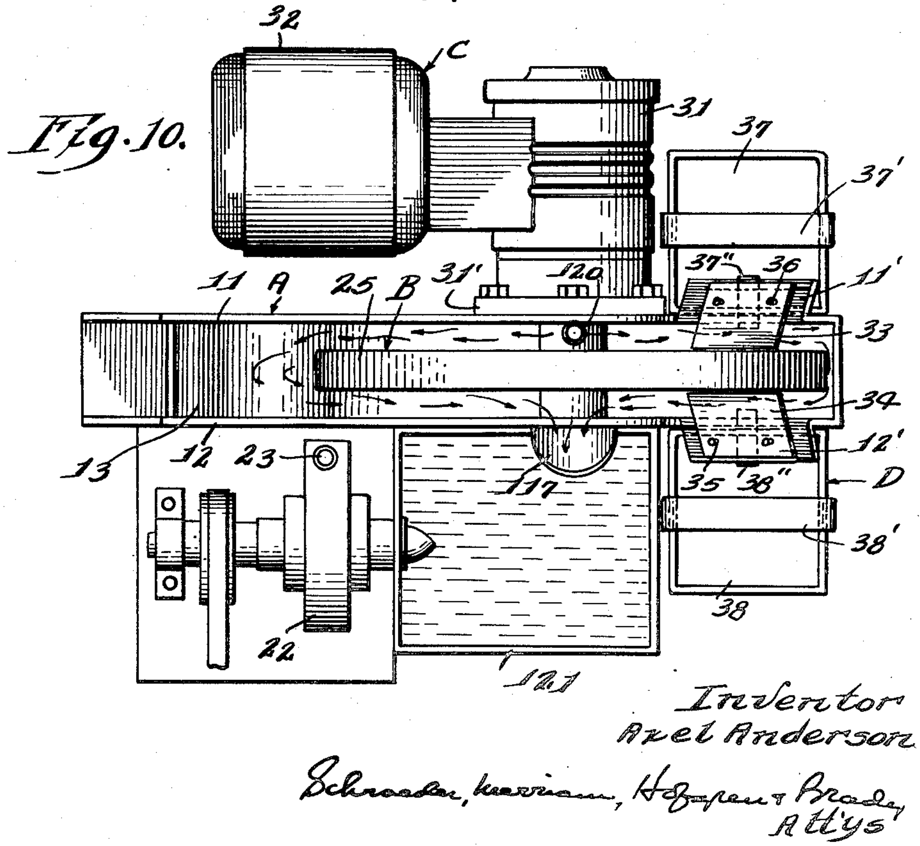
Fig. 10 is a top plan view of the separator shown in Fig. 9.

A modified form of the invention is shown in Figs. 9 and 10. In this form, instead of liquid entering the tank at one end and flowing through the tank in only one direction longitudinally thereof and out of an overflow spout at the other end, liquid enters the tank at one side of the disk adjacent the longitudinal center of the tank and flows out of the tank through an overflow spout at the other side of the disk adjacent the longitudinal center of the tank. The liquid in the tank flows in both directions longitudinally of the tank, and may flow transversely of the tank underneath the disk in the space between the disk and the apron. All the liquid at some time in its travel is adjacent both opposite faces of the disk.

In Figs. 9 and 10, the same reference characters have been used to designate parts which are similar to the apparatus of Figs. 1–8, and the modified structure is designated by reference characters 100 higher than those used for similar parts in Figs. 1–8. The means for delivering coolant liquid to the tank comprises a pipe 120 which extends into the tank on one side of the disk 25 adjacent the longitudinal center of the tank, as shown in Figs. 9 and 10. Liquid from the pipe 120 then flows in both directions longitudinally of the tank, as shown by the arrows in Fig. 10, and may also flow in the space 15 between the disk 25 and the arcuate portion 13' of the apron. An overflow spout 117 is provided in the side wall of the tank which is on the opposite side of the disk from the inlet pipe 120, and a container 121 is provided at that side of the tank to receive liquid discharged from the spout 117. The container 121 may comprise the coolant reservoir for the tool with which the magnetic separator is used, and a pump 22 and outlet pipe 23 are provided to pump cleaned liquid from the container 121 to the discharge nozzle of the tool.

The compartment 14, in the embodiment of Figs. 9 and 10, is merely part of a false bottom and serves not as a contaminant receiving compartment but merely as a structural support. If desired, the side and bottom walls 10, 10' and 10'' may be omitted, their function being carried out by the walls 13, 13'.

Figure 11:
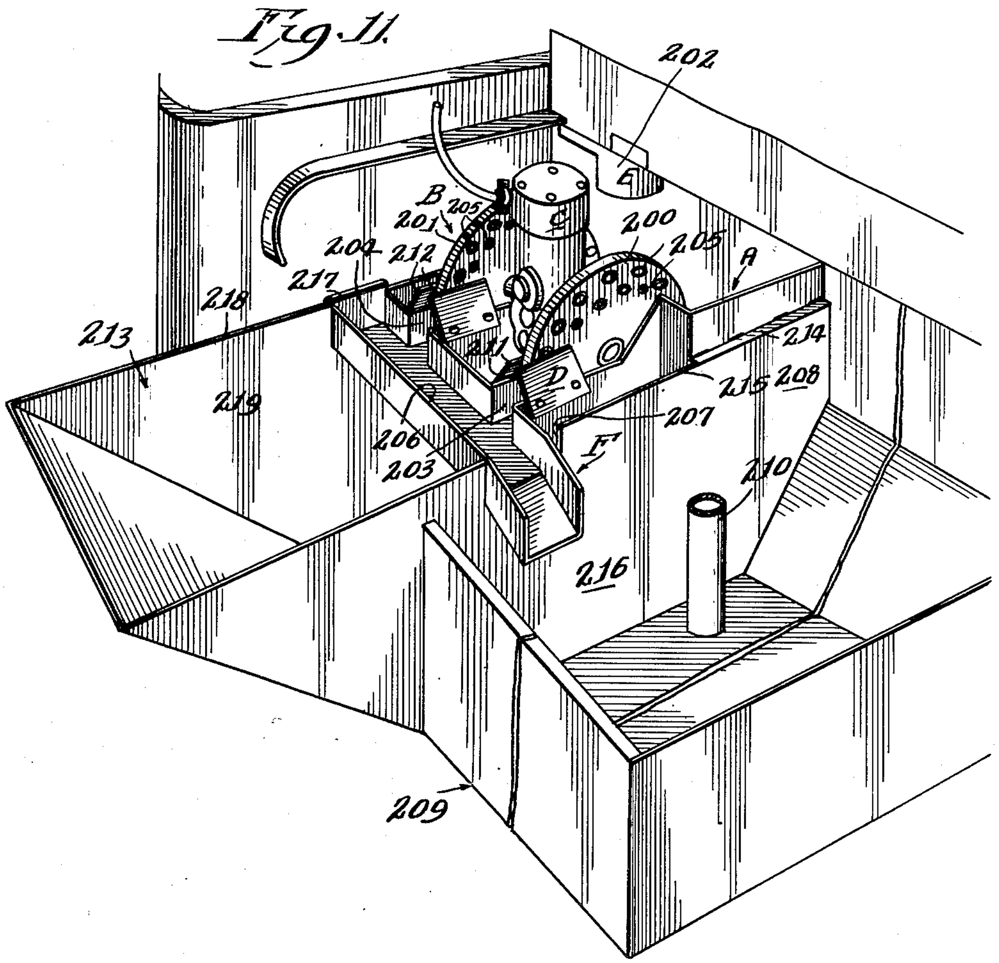
Fig. 11 is a perspective view of a modified form of the invention.
Figure 12:
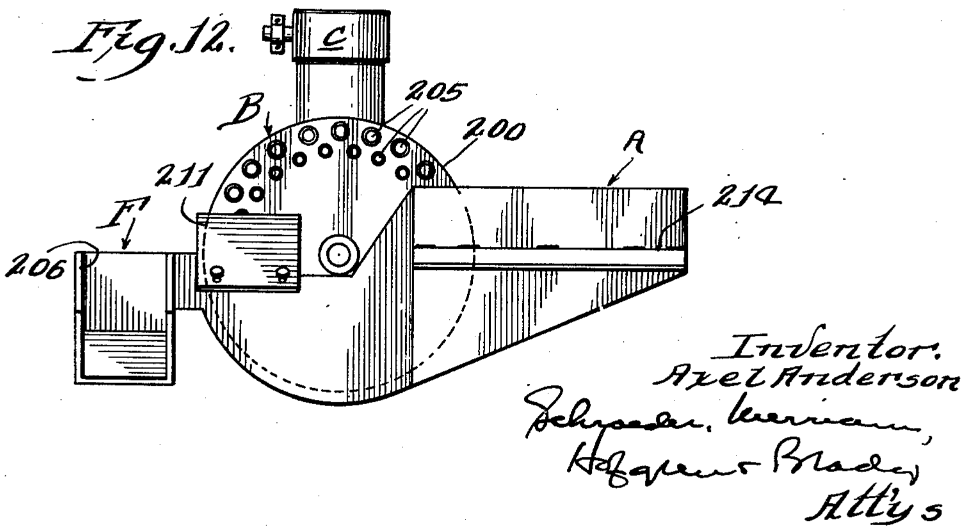
Fig. 12 is a side elevation of the separator portion of Fig. 11.

A further modification of the invention is shown in Figs. 11 and 12. Basically, like the previous embodiments, the device includes a tank A for receiving liquid, a rotary magnetic pickup B driven by a motor and speed reduction apparatus C, scraping means D to remove particles from the sides of the disks, a means E for delivering coolant to the tank A and other means F for delivering decontaminated fluid to a storage tank. It will be noted that two magnetic disks 200 and 201 are provided each driven in the same direction by the motor means C. Coolant is delivered to the tank A by a pipe 202 and flows through a pair of constricted troughs 203, 204 which have side walls closely adjacent the faces of the disks. Two annular rows of permanent bar magnet inserts 205 are provided in each of the disks 200, 201 in the same manner as previously described. The two troughs 203, 204 empty into another trough 206 which extends through a notched portion 207 in the side wall 208 of a storage tank generally designated 209. The storage tank 209 has a large volume so that an ample supply of decontaminated fluid may be stored at one location. Stored fluid is drawn off for re-use through a drawoff pipe 210 which opens into the tank.

Each of the disks 200, 201 is provided with a pair of scrapers 211 and 212. It will be noted that the scrapers extend beyond the periphery of each of the disks as it has been found that in some installations the faces of the disks may be more thoroughly cleaned or scraped of particles thereon by so positioning the scrapers. Metallic particles scraped off the sides of the disks by the scrapers are dropped into a sludge receiving compartment 213. The sludge compartment, like the tank 209, has a large volume so that the separating device may operate for long periods of time without the necessity of cleaning sludge therefrom. For example, the device may be so proportioned as to necessitate cleaning only once a week.

It will be noted that the parts A, C, D, E and F form an integral unit which may be removed when desired. The unit is constructed to rest or seat on the top of the walls forming the storage tank and sludge compartment. To that end, the tank A is provided with a lip 214 on each side which rests on the top 215 of the wall 216 which separates the tank 209 from the compartment 213. One end of the trough 206 rests in the notch 207, and the other end of the trough is provided with a flange 217 which rests upon the top 218 of the outer side wall 219 of the compartment 213.

As previously pointed out, the separator of this invention may be used to separate metallic particles from coolant. However, should the particular metal worked upon be non-magnetic, for example brass, it is clear that the separator is superfluous. When this condition occurs the entire separating unit may be removed so that the pipe 202 empties directly into the compartment 213. When the compartment 213 is practically full of coolant, the coolant may drain therefrom through the notch 207 into the tank 209 from which it may be drawn by means of the pipe 210 as previously described.

I claim:

1. A magnetic separator comprising: a tank having opposite side walls and a bottom; a horizontally disposed apron in said tank spaced above said bottom and abutting said side walls to form a compartment for liquid below said apron and a trough above said apron for the passage of liquid, said apron having a longitudinally extending portion formed in an arc and having a passage adjacent its lowest point opening into said compartment; means for delivering liquid to one end of said trough; a container for receiving liquid discharged from the other end of said trough; a disk of magnetic material having a plurality of equally spaced openings extending transversely between opposite faces adjacent the periphery thereof, said openings being arranged in a circle concentric with the center of said disk, said disk having a radius only slightly smaller than the radius of said arc, and the width of said disk being equal to substantially one-third the distance between said side walls; a permanent bar magnet positioned in each of said openings with its opposite pole faces flush with the opposite faces of said disk, said magnets having all like poles in the same face of said disk; a non-magnetic bushing in each opening spacing the magnet therein from said disk, the ends of said bushings being flush with the faces of said disk; means for mounting said disk concentrically with said arc with a portion of its periphery in said trough closely adjacent, but not in contact with the arcuate portion of said apron and with its faces substantially equally spaced from said side walls; a motor and speed-reducing means for rotating said disk slowly to pass said magnets through said trough longitudinally thereof and in contact with liquid therein; a pair of scrapers operable as the disk rotates to remove particles magnetically held on the faces of said disk, said scrapers being mounted above said trough on opposite sides of said disk and having scraping edges engaging the faces of said disk; spring means yieldably biasing said scraping edges into engagement with said disk; a pair of receptacles readily removably mounted one on each side of said tank for receiving particles removed from the disk by said scrapers, said receptacles each having an overflow pipe adapted to project through said side walls into said trough; and a scoop in said compartment for removing therefrom particles entering said compartment through said passage, said scoop having a handle extending outside said tank.

2. A magnetic separator comprising: a tank having opposite side walls and a bottom; a horizontally disposed apron in said tank spaced above said bottom and abutting said side walls to form a compartment for liquid below said apron and a trough above said apron for the passage of liquid, said apron having a longitudinally extending portion formed in an arc and having a passage adjacent its lowest point opening into said compartment; means for delivering liquid to said trough at one side wall adjacent the longitudinal center thereof; an overflow spout in the opposite side wall adjacent the longitudinal center of said trough; a container for receiving liquid discharged from said spout; a disk of magnetic material having a plurality of equally spaced openings extending transversely between opposite faces adjacent the periphery thereof, said openings being arranged in a circle concentric with the center of said disk, said disk having a radius only slightly smaller than the radius of said arc, and the width of said disk being equal to substantially one-third the distance between said side walls; a permanent bar magnet positioned in each of said openings with its opposite pole faces flush with the opposite faces of said disk, said magnets having all like poles in the same face of said disk; a non-magnetic bushing in each opening spacing the magnet therein from said disk, the ends of said bushings being flush with the faces of said disk; means for mounting said disk concentrically with said arc with a portion of its periphery in said trough closely adjacent, but not in contact with the arcuate portion of said apron and with its faces substantially equally spaced from said side walls between said inlet and said overflow spout; a motor and speed-reducing means for rotating said disk slowly to pass said magnets through said trough longitudinally thereof and in contact with liquid therein; a pair of scrapers operable as the disk rotates to remove particles magnetically held on the faces of said disk, said scrapers being mounted above said trough on opposite sides of said disk and having scraping edges engaging the faces of said disk; spring means yieldably biasing said scraping edges into engagement with said disk; a pair of receptacles readily removably mounted one on each side of said tank for receiving particles removed from the disk by said scrapers, said receptacles each having an overflow pipe adapted to project through said side walls into said trough; and a scoop in said compartment for removing therefrom particles entering said compartment through said passage, said scoop having a handle extending outside said tank.

3. A magnetic separator comprising: a tank having opposite side walls and a bottom; a horizontally disposed apron in said tank spaced above said bottom and abutting said side walls to form a compartment for liquid below said apron and a trough above said apron for the passage of liquid, said apron having a longitudinally extending portion formed in an arc and having a passage adjacent its lowest point opening into said compartment; means for delivering liquid to said trough; a container for receiving liquid discharged from said trough; a disk of magnetic material having a plurality of equally spaced openings extending transversely between opposite faces adjacent the periphery thereof, said openings being arranged in a circle concentric with the center of said disk, said disk having a radius only slightly smaller than the radius of said arc; a bar magnet positioned in each of said openings with its opposite pole faces flush with the opposite faces of said disk; a non-magnetic bushing in each opening spacing the magnet therein from said disk, the ends of said bushings being flush with the faces of said disk; means for mounting said disk concentrically with said arc with a portion of its periphery in said trough closely adjacent, but not in contact with the arcuate portion of said apron and with its faces substantially equally spaced from said side walls; motor means for rotating said disk to pass said magnets through said trough longitudinally thereof and in contact with liquid therein; a spaced pair of scrapers operable as the disk rotates to remove particles magnetically held on the faces of said disk, said scrapers being mounted above said trough on opposite sides of said disk and having scraping edges engaging the faces of said disk; spring means yieldably biasing said scraping edges into engagement with said disk; a pair of receptacles readily removably mounted one on each side of said tank for receiving particles removed from the disk by said scrapers, said receptacles each having an overflow pipe adapted to project through said side walls into said trough; and a scoop in said compartment for removing therefrom particles entering said compartment through said passage, said scoop having a handle extending outside said tank.

4. A magnetic separator comprising: a tank having opposite side walls and a bottom; a horizontally disposed apron in said tank spaced above said bottom and abutting said side walls to form a compartment for liquid below said apron and a trough above said apron for the passage of liquid, said apron having a longitudinally extending portion formed in an arc and having a passage adjacent its lowest point opening into said compartment; means for delivering liquid to said trough; a container for receiving liquid discharged from said trough; a disk of magnetic material having a plurality of equally spaced openings extending transversely between opposite faces adjacent the periphery thereof, said openings being arranged in a circle concentric with the center of said disk, said disk having a radius only slightly smaller than the radius of said arc; a bar magnet positioned in each of said openings with its opposite pole faces flush with the opposite faces of said disk; a non-magnetic bushing in each opening spacing the magnet therein from said disk, the ends of said bushings being flush with the faces of said disk; means for mounting said disk concentrically with said arc with a portion of its periphery in said trough closely adjacent, but not in contact with the arcuate portion of said apron and with its faces substantially equally spaced from said side walls; motor means for rotating said disk to pass said magnets through said trough longitudinally thereof and in contact with liquid therein; a spaced pair of scrapers operable as the disk rotates to remove particles magnetically held on the faces of said disk, said scrapers being mounted above said trough on opposite sides of said disk and having scraping edges engaging the faces of said disk; and a pair of receptacles, one on each side of said tank, for receiving particles removed from the disk, said receptacles each having an overflow pipe adapted to project into said trough.

References Cited in the file of this patent

UNITED STATES PATENTS

| Number | Name | Date |
|---|---|---|
| 85,700 | Seymour | Jan. 5, 1869 |
| 213,519 | McKain | Mar. 25, 1879 |
| 315,028 | Hilder | Apr. 7, 1885 |
| 402,684 | Maxim | May 7, 1889 |
| 939,523 | Ludwick | Nov. 9, 1909 |
| 1,048,223 | Stein | Dec. 24, 1912 |
| 1,527,071 | Peck | Feb. 17, 1925 |
| 2,105,851 | Voback | Jan. 18, 1938 |
| 2,191,962 | Jones | Feb. 27, 1940 |
| 2,272,719 | Maynard | Feb. 10, 1942 |
| 2,432,819 | Schumaker | Dec. 16, 1947 |
| 2,459,343 | Scrivener | Jan. 18, 1949 |
| 2,466,839 | Caldwell | Apr. 12, 1949 |